United States Patent
Cowelchuk et al.

(10) Patent No.: US 7,291,301 B2
(45) Date of Patent: Nov. 6, 2007

(54) METHOD OF MANUFACTURING AN AIRBAG ASSEMBLY AND VEHICLE TRIM COMPONENT

(75) Inventors: Glenn A. Cowelchuk, Chesterfield Township, MI (US); Robert J. Adams, Ypsilanti, MI (US); Michael J. Hier, Milford, MI (US); Todd DePue, Brighton, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 264 days.

(21) Appl. No.: 10/731,244

(22) Filed: Dec. 9, 2003

(65) Prior Publication Data

US 2005/0121818 A1 Jun. 9, 2005

(51) Int. Cl.
*B29C 69/00* (2006.01)
*B29C 45/14* (2006.01)

(52) U.S. Cl. .............. 264/241; 264/251; 264/254; 264/255; 264/259; 264/260; 264/266; 264/271.1; 264/279; 264/279.1

(58) Field of Classification Search ............ 264/239, 264/254, 251
See application file for complete search history.

(56) References Cited

U.S. PATENT DOCUMENTS

| | | | | |
|---|---|---|---|---|
| 5,158,322 A | * | 10/1992 | Sun ............................ 280/732 |
| 5,346,249 A | * | 9/1994 | Hallard et al. ............. 280/728.3 |
| 5,549,324 A | * | 8/1996 | Labrie et al. .............. 280/728.3 |
| 5,618,485 A | * | 4/1997 | Gajewski .................... 264/455 |
| 5,639,115 A | * | 6/1997 | Kelley et al. .............. 280/728.3 |
| 5,685,930 A | * | 11/1997 | Gallagher et al. ........... 156/73.1 |
| 5,728,342 A | * | 3/1998 | Wirt et al. .................... 264/259 |
| 5,997,030 A | * | 12/1999 | Hannert et al. .............. 280/728.3 |
| 6,092,835 A | * | 7/2000 | Thakore et al. .............. 280/728.3 |
| 6,093,258 A | * | 7/2000 | Schiewe et al. .............. 264/250 |
| 6,453,535 B1 | * | 9/2002 | Nicholas ........................ 29/413 |
| 6,460,880 B1 | * | 10/2002 | Gallagher et al. ............ 280/732 |
| 6,780,365 B2 | * | 8/2004 | Goldbach ..................... 264/251 |
| 2003/0080540 A1 | * | 5/2003 | Kinane ....................... 280/728.2 |
| 2003/0164577 A1 | * | 9/2003 | Kieltyka et al. .............. 264/255 |

FOREIGN PATENT DOCUMENTS

| | | |
|---|---|---|
| DE | 195 30 346 A1 | 2/1996 |
| DE | 196 33 109 A1 | 2/1997 |
| WO | WO 96/30232 | 10/1996 |

* cited by examiner

*Primary Examiner*—Christina Johnson
*Assistant Examiner*—Jeff Wollschlager
(74) *Attorney, Agent, or Firm*—MacMillan, Sobanski & Todd, LLC (57) ABSTRACT

A method of manufacturing an airbag assembly and a trim component for vehicle including the step of providing a first mold structure having a first surface formed therein, a second mold structure having a second surface formed therein and a third mold structure having a third surface formed therein. The first mold structure and the second mold structure are positioned to define a first cavity. A first material is introduced into the first cavity to form a substrate. The substrate and the third mold structure are positioned to define a second cavity. A second material is introduced into the second cavity to form at least one of a portion of an airbag assembly and an outer layer overmolded onto the substrate. Additionally, a scrim material may be disposed within the second cavity to produce a hinge having an embedded layer of scrim material.

12 Claims, 4 Drawing Sheets

METHOD OF MANUFACTURING AN AIRBAG ASSEMBLY AND VEHICLE TRIM COMPONENT

BACKGROUND OF THE INVENTION

This invention relates in general to vehicle trim components, and in particular relates to a method of manufacturing an airbag assembly and trim component.

The interior of a vehicle typically includes a multitude of components for covering various frameworks, instruments, and electrical devices mounted within the interior compartment of a vehicle. Examples of trim components include instrument panels, door panels, center consoles, overhead consoles, and other various interior panels for covering the sides, ceilings, and vertical pillars of the frame members of the vehicle.

The instrument panel is generally positioned underneath the windshield and attached to the frame of the vehicle behind the engine compartment. The instrument panel encloses various vehicle components, such as electrical and ventilation systems, audio systems, vehicle instrument gauges and displays, airbag assemblies, and auxiliary compartments.

In the past, trim components, such as instrument panels, were made of metal or plastic and commonly had rigid exterior upper and rear surfaces facing the interior of the vehicle. The upper and rear surfaces of the instrument panel are within reach and direct sight of the occupants of the vehicle. Recently, consumers have been demanding a more aesthetically pleasing exposed surface. It is also preferred that the tactile properties of the surfaces are also more pleasing, such as having soft or elastic properties compared to a relatively rigid surface. Thus, the outer surface areas of the trim components have been covered in a suitably soft material over the rigid structurally accommodating framework of the trim component.

In certain instances, the occupants of a vehicle may come into physical contact with portions of the trim components. During a vehicle impact condition, sudden large impact forces may be delivered to the occupant of the vehicle, such as in a rearward, frontal, or side impact. These forces may cause the head and limbs of the occupant to be forced against trim components and structures of the vehicle, thereby causing injury.

Various countermeasures have been taken to help reduce the degree of injury caused by impact conditions. For example, passive restraint systems having airbags and/or air curtains have been implemented into vehicles. Generally, such airbag assemblies are stored and packaged in deflated condition in storage areas within the passenger compartment of the motor vehicle. The airbag assemblies include sensors located at various points in the vehicle. Upon impact, the sensors are triggered thereby sending a signal to a gas generator or igniter. The gas generator operates to inflate the airbag when it receives a signal from the sensors. The airbags are located at various areas within the interior of the vehicle in which contact with the occupant is likely. For example, airbags are positioned in front of the driver and passenger locations, such as in the steering wheel and passenger side of the trim component or instrument panel. Air curtains may additionally or alternatively be included in such airbag assemblies, and may be positioned along the sides of the occupants, such as mounted at the edges of the headliner and propelled downwardly when inflated. Side air curtains have also been incorporated into the side portions of the seat backs.

When incorporating an airbag assembly into a trim component such as an instrument panel, it is necessary to provide an airbag cover portion in the instrument panel that will reliably and safely tear upon deployment of the airbag, such that the passenger is protected. To this end, a tear seam has generally been provided in the airbag cover portion of an instrument panel to insure that the airbag will safely deploy.

Vehicle designers prefer to have a continuous surface on the front face of the trim component, whenever possible, so they would prefer to avoid having a part line or seam in the trim component. Thus, for trim components such as instrument panels, recently there has been an effort to achieve a "seamless" design wherein there is no indication on the front face of the instrument panel that the airbag is behind the instrument panel. To achieve this design, hidden tear seams or tear strips provided in the instrument panel are only provided on the under face, and not on the front face of the instrument panel.

The trim component must perform the utilitarian function of breaking apart along its tear seam to allow the airbag to exit through the airbag cover portion of the trim component when deployed. Preferably, the airbag cover portion of the trim component should not break apart, especially during cold deployment.

Thus, it is desirable to provide an improved method of manufacturing a trim component and airbag assembly in a "seamless" design that will deploy without undesirable failures, such as during cold deployment. It is also desirable to provide an improved method of manufacturing a trim component and airbag assembly that is cost effective and simplifies the manufacturing process.

BRIEF SUMMARY OF THE INVENTION

This invention relates to a method of manufacturing a trim component for a vehicle. The method includes the step of providing a first mold structure having a first surface formed therein, a second mold structure having a second surface formed therein and a third mold structure having a third surface formed therein. The first mold structure is positioned relative to the second mold structure such that the first and second surfaces are in a spaced relationship with one another to define a first cavity. A first material is introduced into the first cavity to form a substrate. The second mold structure is positioned away from the substrate. The third mold structure is positioned relative to the first mold structure such that the third surface and the substrate are in a spaced relationship with one another to define a second cavity. A second material is introduced into the second cavity to form a portion of an airbag assembly overmolded onto the substrate to produce a trim component and airbag assembly. The first material may be different from the second material, although such is not required.

In an alternate embodiment, a fourth mold structure having a fourth mold surface formed therein may be provided. The fourth mold structure may be positioned relative to an exposed portion of the substrate such that the fourth surface and the substrate are in a spaced relationship with one another to define a third cavity. A third material may be introduced into the third cavity to form an outer layer overmolded to the substrate to form an outer layer of the trim component, although such is not required. It will be appreciated that the outer layer may be formed prior to the substrate and/or the portion of the airbag assembly. It will be appreciated that the second material and third material may be the same material or different materials. It will also be appreciated that the outer layer and the portion of the airbag assembly may be formed simultaneously.

In a further alternate embodiment, a first mold structure is positioned relative to a second mold structure such that first and second surfaces are in a spaced relationship with one another to define a first cavity. A first material is introduced into a first cavity to form a substrate, in a similar manner as described above. However, the substrate may be formed having at least one aperture therethrough. The first mold structure and second mold structure are positioned away from the substrate. The substrate is positioned within a second cavity of a third mold structure. A second material is introduced into the third mold structure, such that the second material flows through the at least one aperture in the substrate to form an outer layer and a portion of an airbag assembly on opposing sides of the substrate.

Additionally, a scrim material may be disposed within the second cavity, although such is not required. The scrim material may be disposed within the second cavity, such that after the portion of the airbag assembly is overmolded to the trim component, the scrim material is embedded within the portion of the airbag assembly, such that the scrim material is also overmolded to the trim component.

Various objects and advantages of this invention will become apparent to those skilled in the art from the following detailed description of the preferred embodiment, when read in light of the accompanying drawings.

DETAILED DESCRIPTION OF THE INVENTION

Figure 1:
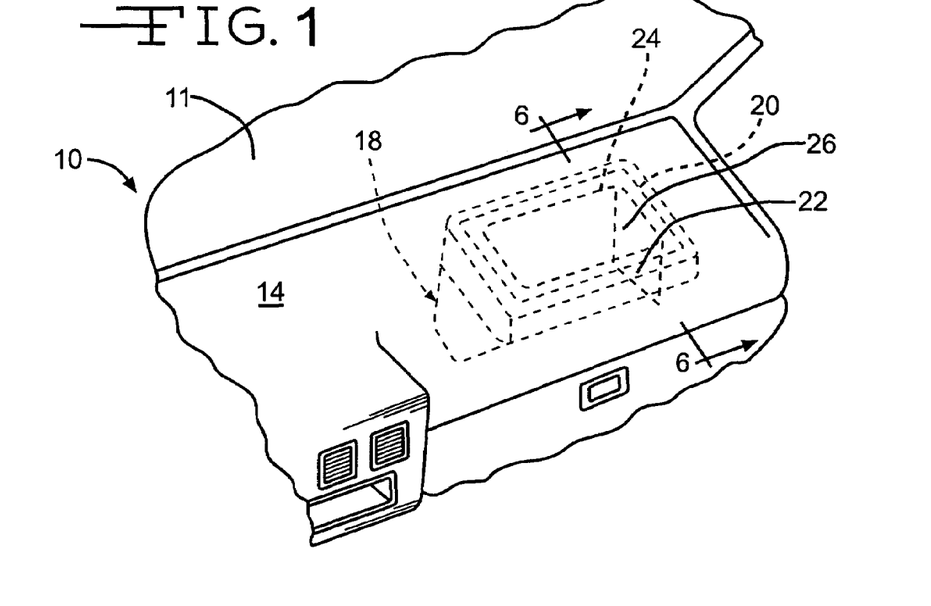
FIG. 1 is a schematic perspective view of an instrument panel manufactured in accordance with the method of the present invention.

Referring now to the drawings, there is illustrated in FIG. 1, an instrument panel and airbag assembly, indicated generally at 10. It should be understood that while the method of manufacturing a trim component in accordance with the present invention will be described and shown in FIGS. 1 through 9 with respect to the assembly 10, the method may be practiced to form any type of trim component or portions of trim components for a vehicle formed of at least two different materials. Other suitable examples of trim components which can be formed from the present invention include door panels, center consoles, overhead consoles, and other various interior panels for covering the sides, ceilings, and/or vertical pillars of the frame members of the vehicle.

The assembly 10 is installed on a vehicle frame generally in the area underneath a windshield 11 and between the engine compartment and the interior of the vehicle. The assembly 10 can include any suitable frame structure (not shown) for supporting the assembly 10 on the vehicle frame. The portion of the assembly 10 illustrated in FIG. 1 preferably defines the upper and a section of the rear portion of the instrument panel facing the interior of the vehicle. Since the upper and rear portion of the instrument are within reach and direct sight of the occupants of the vehicle, it is desirable for this portion of the instrument panel to be aesthetically pleasing in color and texture as well as having a desirable tactile feel, such as a soft or slightly elastic feel.

The assembly 10 generally includes a substrate 12 and an outer layer 14. The outer layer 14 generally covers the upper portion and a section of the rear portion of the substrate 12. A portion of the outer layer 14 may be removed, thereby exposing the substrate 12 to provide a two tone or dual material appearance viewable by passengers within the interior cabin of the vehicle. The substrate 12 and the outer layer 14 can have any suitable contour and apertures for receiving various vehicle controls, components and systems. The substrate 12 of the assembly 10 can be molded in accordance with the present invention with materials other than the outer layer 14 at various areas to form various features such as seals, pads, gap hiding strips, membranes, living hinges, trays, storage compartment liners, and membrane speakers. It will be appreciated that although the outer layer 14 is desirable in a preferred embodiment of the invention, the outer layer 14 is an optional portion of the assembly 10 and is not required in the present invention.

The substrate 12 is preferably made of a relatively rigid material so as to provide support for the outer layer 14, and more preferably is made of a polymer or plastic material. Although additional members or framework may be attached to the substrate 12 for supporting the assembly 10 onto the frame of the vehicle, preferably the substrate 12 is rigid enough to structurally support itself and the outer layer 14, since the outer layer 14 preferably has a relatively high elasticity and would generally be unable to support itself across the span of the assembly 10. Examples of suitable materials for the substrate 12 include thermoplastic elastomer, thermoplastic elastomer olefin, thermoplastic elastomer polyolefin, Santoprene®, styrene maleic anhydride, Dylark®, polycarbonate, polypropylene, acrylonitrile butadiene styrene (ABS), polycarbonate acrylonitrile butadiene styrene, styrene maleic anhydride (SMA), polyphenylene oxide (PPO), nylon, polyester, acrylic, polysulfone, thermoplastic polyether, thermoplastic urethane, polypropylene, polyurethane, copolyester, thermoplastic styrenic elastomer, and nylon. The substrate 12 can also have any suitable textured surface and color.

Various covers and panels may be attached to the substrate 12 to cover exposed positions thereof. For example, an aesthetically pleasing trim panel, such as a faux wood or carbon fiber panel (not shown) may be used to cover a portion of the substrate 12. Other components, such as vent covers, display devices, electronic controls, audio/video entertainment units, and the like may be attached to the substrate 12 and covering at least a portion of the substrate 12. Alternatively, all of the exposed portions of the assembly 10 may be covered and not seen from within the interior of the vehicle.

The substrate 12 can be formed of a single part or can be formed from attaching separate relatively rigid sections, thereby forming the substrate 12 as shown in FIG. 1. It should also be understood that portions of the substrate 12 can be partially or totally covered in separate trim panels. Also, portions of the substrate 12 may be covered by housings of various vehicle components mounted thereon or within the apertures formed in the substrate 12.

The outer layer 14 is preferably made of a softer material than the substrate 12 and has a generally soft tactile feel compared to the substrate 12. Preferably, the outer layer 14 is made of a polymer or synthetic rubber. Examples of suitable materials for the outer layer 14 include thermoplastic elastomer, or thermoplastic elastomer polyolefin. The outer layer 14 can also have any suitable textured surface and color. Preferably, the outer layer 14 is of a different material than the substrate 12 so that the surface of the outer layer has a different tactile characteristic than the surface of the substrate 12. For example, the substrate 12 can have a higher coefficient of friction than the outer layer 14.

Figure 6:
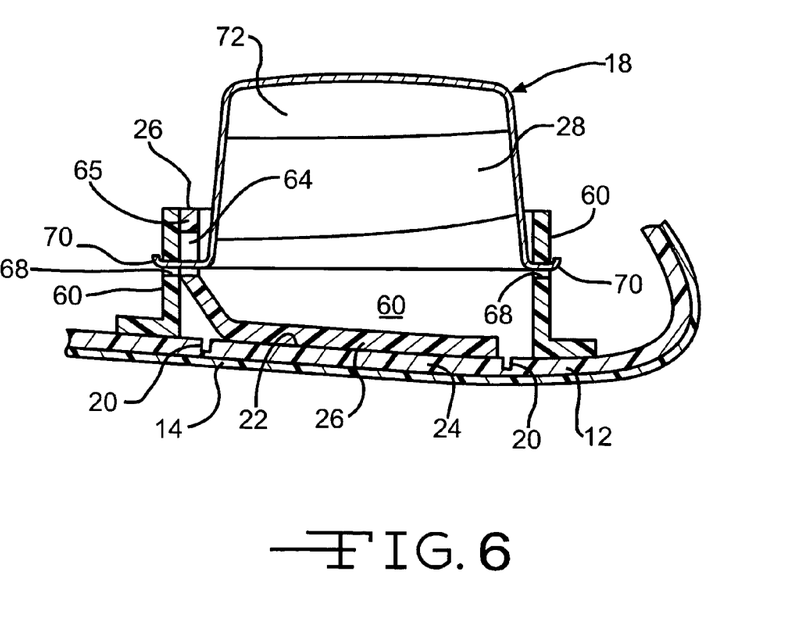
FIG. 6 is a cross-sectional view of the instrument panel of FIG. 1 taken along lines 6-6 in FIG. 1

Shown in phantom outline in FIG. 1 is an airbag module 18 located behind the substrate 12. As best shown in FIG. 6, a tear seam 20 is formed in an under face 22, of the assembly 10. Preferably, the tear seam 20 defines an airbag door 24. It will be appreciated that the tear seam 20 can be any weakened area of the assembly 10, such that an airbag 28, as shown in FIG. 6, can exit the assembly 10 when the airbag 28 is deployed, for example, during a vehicle collision. The airbag door 24 is attached to the vehicle by a hinge 26. The hinge 26 allows the airbag 28 to force the airbag door 24 free from the assembly 10, yet retains the airbag door 24 such that the airbag door 24 does not freely enter the interior cabin of the vehicle.

As shown in FIG. 1, the tear seam 20 has a substantially rectangular shape. However, it will be appreciated that the tear seam 20 can be of any desired shape, such as U-shaped, or H-shaped. The tear seam 20 can be formed by any desired method. Preferably, the tear seam 20 is formed by laser scoring, as will be described below. The hinge 26 may be overmolded to the substrate 12 of the assembly 10 by the method of this invention. Preferably, the hinge 26 is overmolded to the substrate 12 within the airbag door 24 defined by the tear seam 20.

The assembly 10 further includes at least one portion of an airbag assembly, such as the hinge 26. The at least one portion of the airbag assembly may be a hinge, chute or other portion of an airbag assembly that is overmolded to the substrate 12. Examples of suitable materials for the portion of the airbag assembly include thermoplastic elastomer, thermoplastic elastomer olefin, thermoplastic elastomer polyolefin, Santoprene®, styrene maleic anhydride, Dylark®, polycarbonate, polypropylene, acrylonitrile butadiene styrene (ABS), polycarbonate acrylonitrile butadiene styrene, styrene maleic anhydride (SMA), polyphenylene oxide (PPO), nylon, polyester, acrylic, polysulfone, thermoplastic polyether, thermoplastic urethane, polypropylene, polyurethane, copolyester, thermoplastic styrenic elastomer, and nylon. It will be appreciated that the materials of the substrate 12 and the hinge 26 may be the same material or different materials that are suitable for overmolding to one another as described herein. In a preferred embodiment, the material of the hinge 26 is a thermoplastic elastomer, such as Santoprene® with a durometer of less than about 85 Shore A, so that the hinge 26 may flex, as will be described herein. In a more preferred embodiment, the material of the hinge 26 has a durometer of about 65 Shore A.

Figure 2:
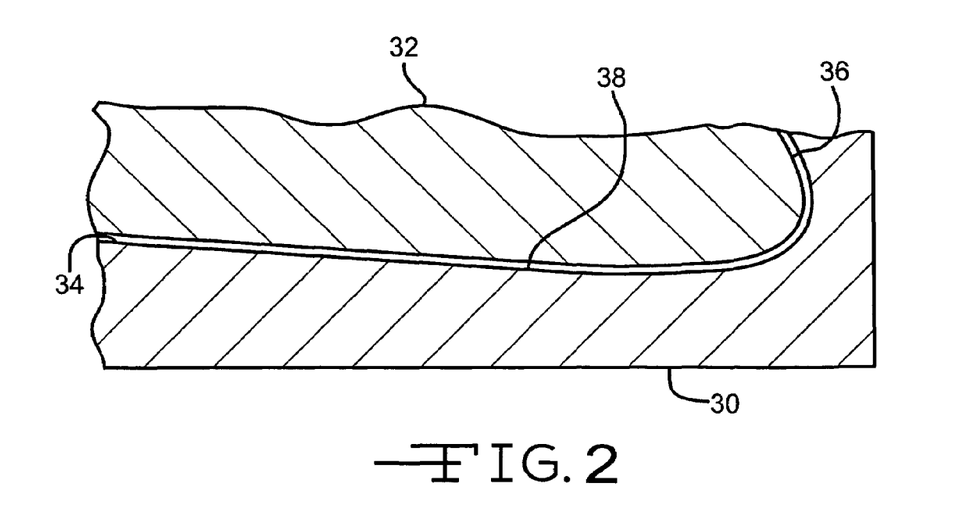
FIG. 2 is a cross-sectional view of a mold assembly first mold structure and a second mold structure illustrating a preferred method of manufacturing the instrument panel of FIG. 1.
Figure 3:
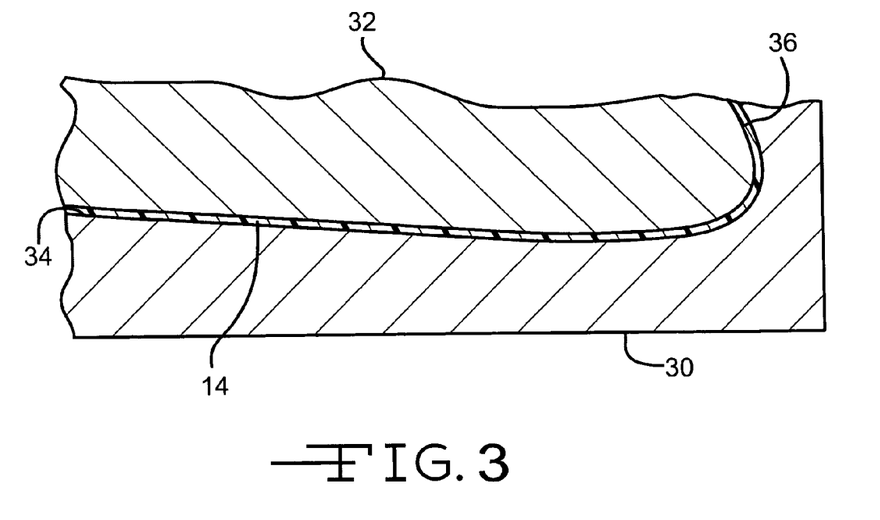
FIG. 3 is a cross-sectional view of the first mold structure and the second mold structure shown in FIG. 2, illustrating another step of the preferred method of manufacturing the instrument panel of FIG. 1.

The assembly 10, including an instrument panel or other vehicle component, is preferably manufactured by a generally three step mold process, as schematically illustrated in FIGS. 2 through 5. As shown in FIG. 2, a first mold structure 30 is movably mounted relative to a second mold structure 32. The mold structures 30 and 32 include contour surfaces 34 and 36, respectively, facing one another in a spaced apart relationship which define a cavity 38. The cavity 38 generally corresponds to the shape and the dimension of the substrate 12. The first and second mold structures 30 and 32 are moved together to their position illustrated in FIG. 2, and a first material is introduced into the cavity 38 to form the outer layer 14 as shown in FIG. 3 in section in the cavity 38. The first material is introduced into the cavity 38 in a liquefied form and is partially or completely cooled and/or cured to form the outer layer 14. The surface 34 corresponds to the rear surface of the outer layer 14 facing the interior of the vehicle, as shown in FIG. 1. The surface 36 generally corresponds to the front surface (not viewable in FIG. 1) facing the engine compartment.

Figure 4:
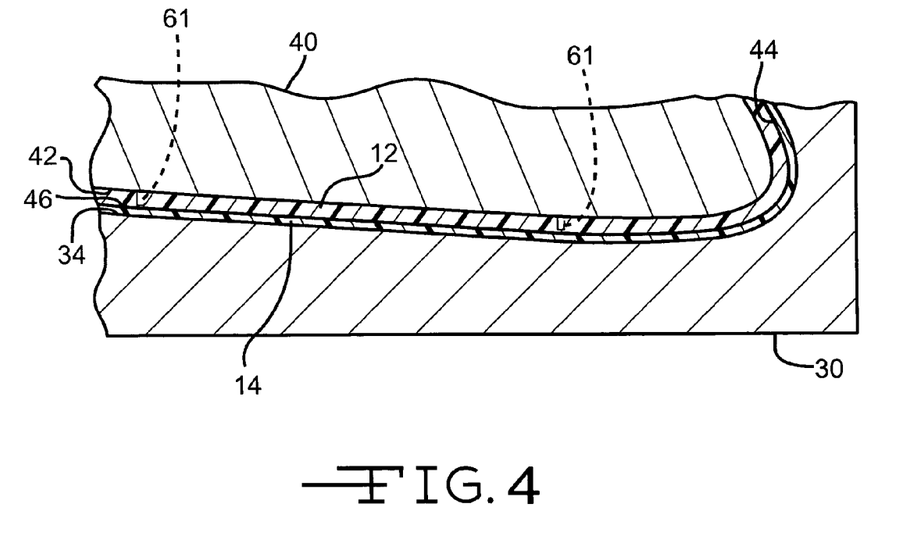
FIG. 4 is a cross-sectional view of the first mold structure shown in FIGS. 2 and 3, and a third mold structure, illustrating another step of the preferred method of manufacturing the instrument panel of FIG. 1.

Next, the second mold structure 32 is moved away from the first mold structure 30, and a third mold structure 40 is generally positioned in its place, as shown in FIG. 4. Preferably, the outer layer 14 remains on the first mold structure 30 during replacement of the second mold structure 32. The third mold structure 40 includes a contour surface 42 facing the outer layer 14 and the contour surface 34 of the first mold structure 30. The contour surface 42 of the third mold structure 40 and a surface 44 of the outer layer 14 are spaced apart from one another to define a cavity 46. The cavity 46 generally corresponds to the shape and dimension of the substrate 12. A second material is then introduced into the cavity 46 to form the substrate 12, such that the substrate 12 is overmolded onto the surface 44 of the outer layer 14.

It will be appreciated that although the substrate 12 has been described as formed subsequent to the outer layer 14, in a preferred embodiment, the substrate 12 is formed prior to the outer layer 14, and the outer layer 14 is overmolded to the substrate 12. It will be appreciated that in a preferred embodiment, the inherent strength of the substrate 12 may facilitate the overmolding of the outer layer 14 to the formed substrate 12. It should also be understood that the outer layer 14 is optional, and in accordance with the present invention, only a substrate layer 12 may be formed.

Figure 5:
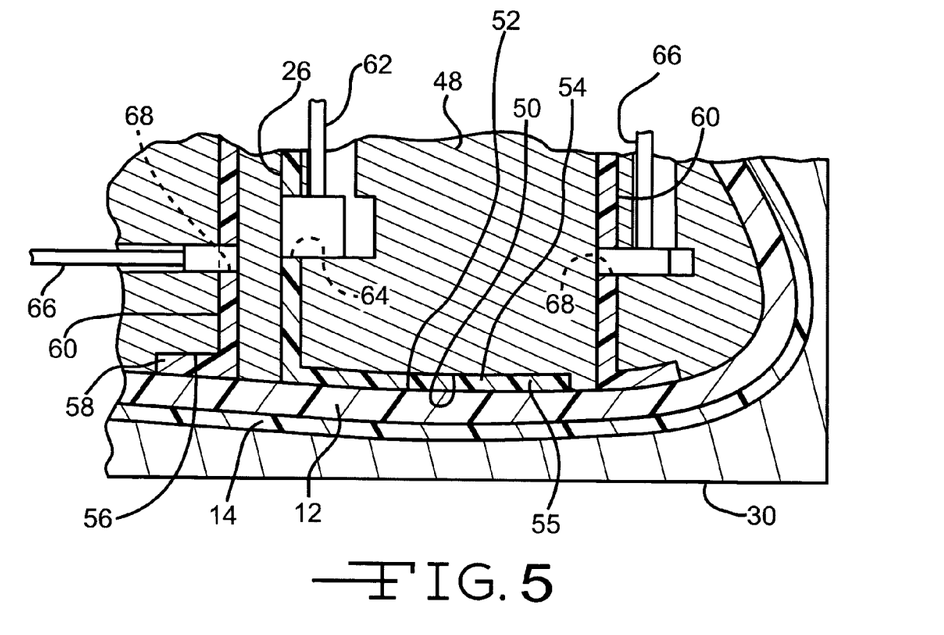
FIG. 5 is a cross-sectional view of the first mold structure shown in FIGS. 2 and 3, and a fourth mold structure, illustrating another step of the preferred method of manufacturing the instrument panel of FIG. 1.

Next, the third mold structure 40 is moved away from the first mold structure 30, and a fourth mold structure 48 is generally positioned in its place, as shown in FIG. 5. Preferably, the outer layer 14 and the substrate 12 remain on the first mold structure 30 during replacement of the third mold structure 40. The fourth mold structure 48 includes a first contour surface 50 partially facing the substrate 12 and the contour surface 34 of the first mold structure 30. The first contour surface 50 of the fourth mold structure 48 and a surface 52 of the substrate 12 are spaced apart from one another to define a cavity 54. The cavity 54 generally corresponds to the shape and dimension of the hinge 26. A third material is then introduced into the cavity 54 to form the hinge 26, such that a first portion 55 of the hinge 26 is overmolded onto the surface 52 of the substrate 12.

The fourth mold structure 48 also includes a second contour surface 56 partially facing the substrate 12 and the contour surface 34 of the first mold structure 30. The second contour surface 56 of the fourth mold structure 48 and a surface 52 of the substrate 12 are spaced apart from one another to define a cavity 58. The cavity 58 generally corresponds to the shape and dimension of a chute 60. In a preferred embodiment, the chute 60 is generally a rectangular ring having an L-shaped cross-section, as best shown in FIG. 6, although such is not required. It will be appreciated that the chute 60 may have any desired cross-section and may be generally annular or rectangular in shape such that the chute 60 surrounds the airbag door 24. A fourth material is then introduced into the cavity 58 to form the chute 60, such that the chute 60 is overmolded onto the surface 52 of the substrate 12. It will be appreciated that the third and fourth material may be the same material, and that the third and fourth materials may be introduced into the respective cavities 54, 58 simultaneously, although such is not required. It will be appreciated that the third material and fourth material may be different materials. Further, the third material and fourth material may be molded during different molding steps, and multiple mold structures may also be used to mold the hinge 26 and chute 60.

The fourth mold structure 48 may also include a movable plug apparatus 62, although such is not required. The plug apparatus 62 remains in an extended position in which a portion of the plug apparatus 62 enters the cavity 54 during the above described molding process to form an aperture 64 in a second portion 65 of the hinge 26 that is not overmolded to the substrate 12. After the molding of the hinge 26 is complete, the plug apparatus 62 moves into a retracted position within the walls of the fourth mold structure 48 to allow for the removal of the assembly 10 from the fourth mold structure 48. The aperture 64 is used to secure the hinge 26 to the chute 60, as will be described below.

The fourth mold structure 48 may further includes a plurality of plug apparatuses 66, although such is not required. The plug apparatuses 66 remain in a extended position in which a portion of each of the plug apparatuses 66 enters the cavity 58, each forming an aperture 68 in the chute 60 during the molding process. The apertures 68 in the chute 60 provide means for securing the airbag module 18 to the chute 60 as will be explained below. After the molding of the chute 60 is complete, the plurality of plug apparatuses 66 move into a retracted position within the walls of the fourth mold structure 48 to allow for the removal of the assembly 10 from the fourth mold structure 48. It should be understood that the apertures 64 and 68 can be created by any suitable method, such as being punched out after the molding process.

It will be appreciated that any portion of an airbag assembly may be overmolded to the instrument panel portion of the assembly 10 in the third molding step described above. It will further be appreciated that the first molding step, overmolding the outer layer 14, is not required to practice the method of the invention.

The mold structures can be any conventional mold structures and positioned and moved by any suitable conventional manner. For example, the first mold structure 30 may remain stationary, and the second, third, and fourth mold structures 32, 40, 48 may be moved into and out of their respective positions relative to the first mold structure 30. Although the first mold structure is shown and described as being stationary, it should be understood that any of the mold structures can be moved to any position relative to one another throughout the process to manufacture the instrument panel and airbag assembly 10. It will also be appreciated that although the outer layer 14 is described as being formed prior to the substrate 12, the substrate 12 may be formed first and the outer layer 14 may be overmolded to the substrate 12, in a manner similar to that described above.

The assembly 10 may be formed such that the outer layer 14 does not completely overmold the substrate 12, thereby revealing an exposed portion (not shown). This provides an assembly 10 having a decorative two-tone, material appearance.

The assembly 10 includes other generally elastomeric features which can be manufactured in accordance with the present invention as described above. These features can be overmolded onto the substrate 12 in a similar manner as the outer layer 14 is molded on the substrate 12 as described above. An advantage of providing these features molded onto the substrate 12 is that the features do not need to be separately manufactured and then independently located and then attached to the substrate 12, as is conventionally done in the industry, thereby saving reducing costs and manufacturing time. Variously shaped clips, fasteners, and locator pins (not shown) could also be molded onto the substrate 12 or the outer layer 14 in accordance with the present invention.

It should be understood that the various materials to be overmolded as described herein can be introduced into the various cavities at any suitable temperature and pressure and with or without any other materials, such as for example, a blowing agent. Alternatively, either the substrate 12, the outer layer 14, the hinge 26, and/or the chute 60 may be formed by a reaction injection molding process mixing two different materials together, such as a resin and a catalyst. For example, it may be preferred to form the outer layer 14 with a liquid two component urethane injected under low pressure without a blowing agent such that the outer layer 14 remains a solid skin.

The materials of which the substrate 12, the hinge 26, and/or the chute 60 are made may include an optional adhesive promoter to form a bond between the surfaces being overmolded as described herein. The overmolded materials could also be heated or maintained at an adequate temperature so that a melted bond formed therebetween. Alternatively, a separate adhesive layer (not shown) could be introduced between the overmolded materials to form a laminated instrument panel and airbag assembly 10. It will be appreciated that the outer layer 14 or manufacture of the outer layer 14 is not required to practice the method of the present invention. It will also be appreciated that a hinge 26 and chute 60 are not required to practice the method of the present invention. Any portion of an airbag assembly may be overmolded to the substrate 12 in accordance with the present invention.

In FIG. 6, there is shown the combination substrate 12, outer layer 14, hinge 26 and chute 60 removed from first and fourth mold structures 30 and 48. The tear seam 20 has been formed in the under face 22, of the assembly 10, preferably by laser scoring. The tear seam 20 generally defines the airbag door 24. It will be appreciated that the tear seam 20 can be any weakened area of the assembly 10, such that the airbag 28 can exit the assembly 10 when the airbag 28 is deployed. Preferably, the airbag door 24 is defined such that the airbag door 24 encompasses the portion of the substrate 12 in which the hinge 26 is overmolded thereto. The tear seam 20 may also be formed by using relatively thin blade walls 61, as shown in phantom in FIG. 4, extending from the contour surface 42 of the third mold structure 40. The walls 61 are generally in the shape and size of the desired seam 20.

The airbag module 18 is secured to the airbag chute 60. Preferably, the airbag module 18 is attached to the chute 60 with resilient hooks, schematically shown at 70, formed to the airbag module 18 that are tension fit within the apertures 68 in the chute 60, although such is not required. It will be appreciated that the airbag module 18 may be attached to the chute 60 be any suitable means, including the use of threaded fasteners (not shown), and the apertures 68 may not be required to be formed in the chute 60 depending on the fastening means employed. At least one of the hooks 70 of the airbag module 18 may also secure the second portion 65 of the hinge 26 to the chute 60 by extending through the aperture 64, such that the hinge 26 is fixed between the hook 70 and the chute 60. However, it will be appreciated that the second portion 65 of the hinge 26 may be attached to the vehicle and/or the chute 60 by any known fastening means. The airbag module 18 preferably includes the airbag 28 and an airbag inflator 72. The airbag inflator 72 and the airbag 28 are shown schematically for illustration purposes since they are known in the art and their construction forms no part of the invention. As will be understood by one of ordinary skill in the art, the shape of the airbag module 18, airbag inflator 72, and airbag 28 may vary from that shown.

The second portion 65 of the hinge 26 may be attached to the chute 60 be any conventional attachment mechanism. As described above, at least one of the hooks 70 of the chute 60 may be disposed within the aperture 64 of the hinge 26 to secure the hinge 26 to the chute 60. The aperture 64 of hinge 26 may be formed so that the aperture 64 is elongated. Providing an elongated aperture 64 in the hinge 26 provides slack, thereby allowing the hinge 26 to be movable between a retracted position and an extended position relative to the chute 60. The hinge 26 may be installed within the assembly 10 in the retracted position and may be movable to the extended position when the airbag is deployed and the airbag door 24 is removed from the assembly 10 to allow the airbag door 24 to swing further outward from the chute 60. This may be desirable such that the airbag door 24 does not interfere with the airbag 28 as the airbag 28 is deployed into the passenger compartment of the vehicle. Additionally, the hinge 26 may be elastomeric such that the hinge 26 stretches when the airbag door 24 is removed, so that the airbag door 24 swings further outward from the chute 60. It will also be appreciated that the hinge 26 may be elastomeric in lieu of an aperture being formed in the hinge 26.

Figure 7:
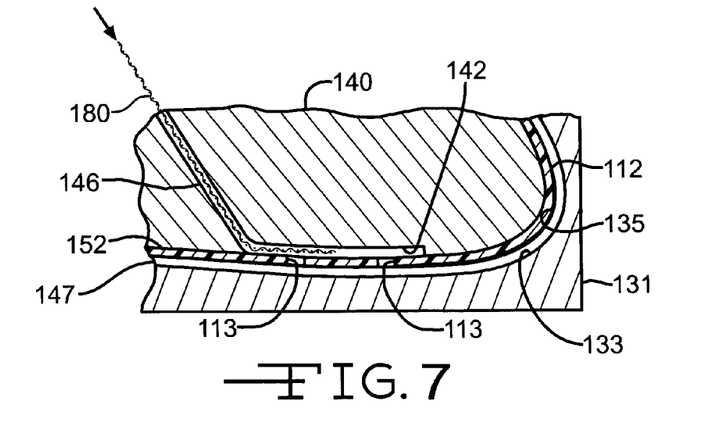
FIG. 7 is a cross-sectional view of a mold assembly fifth mold structure and a sixth mold structure illustrating a preferred method of manufacturing an alternate embodiment of an instrument panel.
Figure 8:
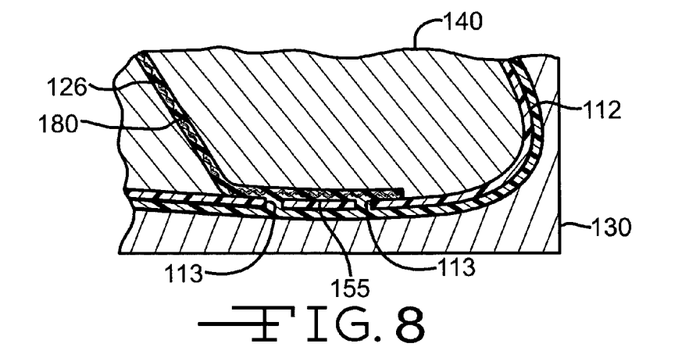
FIG. 8 is a cross-sectional view of the mold assembly shown in FIG. 7 illustrating another step of the preferred method of manufacturing the instrument panel.
Figure 9:
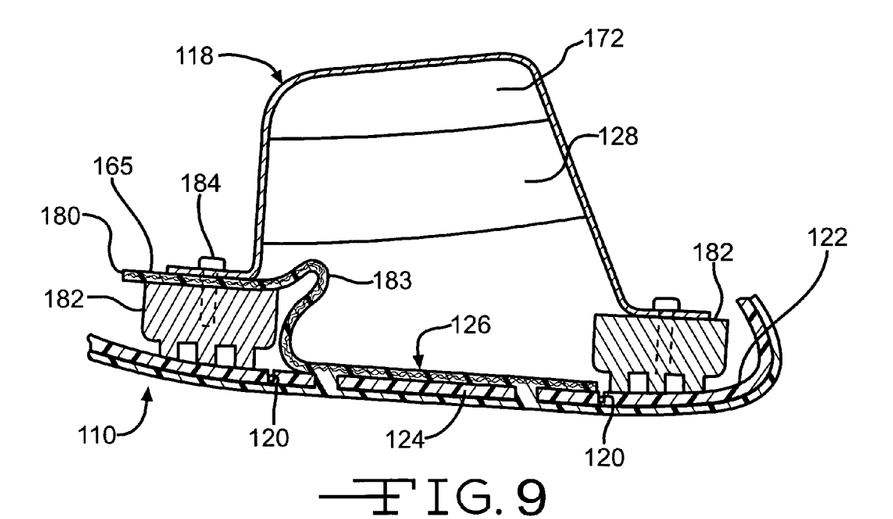
FIG. 9 is a cross-sectional view of an alternate embodiment of an instrument panel manufactured according to the method of the present invention.

Referring now to FIGS. 7-9, there is illustrated an alternate embodiment of a method of forming an instrument panel 110 in accordance with the method of the present invention. The instrument panel 110 is similar to the assembly 10, and the method of manufacturing the instrument panel 110 is similar to the method of manufacturing the assembly 10, except as described herein. Therefore, similar reference numerals with the additional of 100 have been used to indicate elements in the manufacture of the instrument panel 110 that correspond to similar elements in the manufacture of the assembly 10.

As described above for the substrate 12, a first mold structure (not shown) is movably mounted relative to a second mold structure (not shown) to form a cavity (not shown), and a substrate 112 is molded within the cavity. The substrate 112 differs from the substrate 12 in that the substrate 112 may have at least one aperture 113 formed therethrough. The purpose of the at least one aperture 113 will be described in more detail below.

As shown in FIG. 7, the first and second mold structures are moved away from the substrate, and a third mold structure 131 and fourth mold structure 140 are positioned relative to the substrate 112. The substrate 112 may be retained within a portion of either the first mold structure or the second mold structure while the third mold structure 131 and the fourth mold structure 140 are positioned around the substrate 112. It will be appreciated that the first and second mold structures and the third and fourth mold structures 131, 140 may be part of a mold apparatus (not shown). The mold apparatus, the first or second mold structures, or the third and fourth mold structures 131, 140 may include holding pins or other attachment devices for positioning and holding the substrate 112 during the overmolding process, including supporting and positioning the substrate 112 during the mold replacement process.

It will be appreciated that the substrate 112 may be formed using any suitable process. In an embodiment of the present invention, the forming of the substrate 112 is not part of the method of the invention, and the substrate 112 is provided and disposed within the third and fourth mold structure 131, 140 to begin the method as described herein.

The third mold structure 131 includes a contour surface 133. The contour surface 133 and a surface 135 of the substrate 112 are spaced apart from one another to define a cavity 147. The fourth mold structure 140 includes a contour surface 142. The contour surface 142 of the fourth mold structure 140 and a surface 152 of the substrate 112 are spaced apart from one another to define a cavity 146. The cavity 146 generally corresponds to the shape and dimension of a hinge 126. The cavity 147 generally corresponds to the shape and dimension of an outer layer 114. The cavity 146 and the cavity 147 may be communicably connected by the at least one aperture 113 in the substrate 112, although such is not required. It will be appreciated that to facilitate the communicable connection of the cavities 146 and 147, the at least one aperture 113 may be formed through the portion of the substrate 112 that will be overmolded on opposing sides to the outer layer 114 and the hinge 126, respectively.

Next, a layer of scrim material 180 is disposed within the cavity 146. As illustrated in FIG. 7, the scrim material 180 is shown being inserted into and is only partially disposed within the cavity 146, although it will be understood that preferably the scrim material 180 is completely disposed within the cavity 146. The scrim material 180 is preferably made of a lightweight polymer or plastic, such as polyethylene terephthalate (PET), nylon, or blends thereof. The scrim material 180 may be a woven, non-woven, or film backing or barrier.

A second material is then introduced into the cavity 146 and the cavity 147 to form the hinge 126 and the outer layer 114, respectively, such that a first portion 155 of the hinge 126 is overmolded onto the surface 152 of the substrate 112 and the outer layer 114 is overmolded onto the surface 135 of the substrate 112. The second material may be introduced into each of the cavities 146, 147 or may be introduced into one of the cavities 146, 147, if the cavities 146, 147 are communicable connected by the at least one aperture 113 in the substrate 112. If the cavities 146, 147 are communicable connected, the second material may be introduced into only one of the cavities 146, 147, such that the second material may flow from one of the cavities 146, 147 into the other. Thus, introduction of the second material into the cavities 146, 147 may be simplified if the cavities 146, 147 are communicable connected by the at least one aperture 113.

Communicable connection of the cavities 146, 147 may be desirable if the same material will be used to mold the hinge 126 and the outer layer 114. However, if it is desirous to form the hinge 126 and the outer layer 114 of different materials, it will be appreciated that the substrate 112 may be formed without at least one aperture 113, such that the cavities 146, 147 are not communicably connected. Alternatively, the third and fourth mold structures 131, 140 may prevent communication of the cavities 146, 147, respectively. Thus, in accordance with this invention, the material of the hinge 126 and the material of the outer layer 114 may be introduced into the respective cavities 146, 147 simultaneously without intermixing of the materials, such that the outer layer 114 and the hinge 126 may be formed from different materials. It will also be appreciated that the hinge 126 and the outer layer 114 may be formed in separate molding operations, as described in the previous embodiment of the invention.

In a preferred embodiment, the scrim material 180 is embedded within the molded hinge 126, such that the scrim material 180 is substantially encapsulated within the molded hinge 126. It will also be appreciated that the scrim material 180 may be secured within the cavity 146, such as by pins (not shown), to facilitate alignment of the scrim material 180 within the hinge 126. Preferably, the hinge 126 is formed such that the scrim material 180 will be completely encapsulated within the hinge 126 after the hinge 126 has been overmolded. In a preferred embodiment, the hinge 126 is formed such that the thickness of the hinge 126 is about 1.5 millimeters, such that the scrim material 180 is embedded substantially within the center of the thickness of the hinge 126, although such is not required. The combination of the second material and the scrim material 180 increases the strength of the hinge 126, yet allows the hinge 126 to function flexibly during deployment of the airbag 128. In a preferred embodiment, the hinge 126 may have a durometer of less than about 85 Shore A, and more preferable, the durometer is about 65 Shore A.

It will also be appreciated that the hinge 126 may not include any scrim material, as described in the previous embodiment. In a preferred embodiment, the outer layer 114 and the hinge 126 are formed from the same material, and the hinge 126 does not include scrim material.

As shown in FIG. 9, a tear seam 120 is formed in an under face 122, of the instrument panel 110. Preferably, the tear seam 120 defines an airbag door 124. It will be appreciated that the tear seam 120 can be any weakened area of the instrument panel 110, such that an airbag 128 can exit the instrument panel 110 when the airbag 128 is deployed. Preferably, the airbag door 124 is defined such that the airbag door 124 encompasses the portion of the substrate 112 in which the hinge 126 is overmolded thereto.

Next, an airbag collar 182 may be secured to the assembly 10 by any suitable method, such as vibration welding. An airbag module 118 including an airbag 128 and an airbag inflator 172 may be then secured to the collar 182 by any suitable method, such as by bolts 184. The hinge 126 may also be secured to the collar 182 by the bolts 184, or by any other suitable attachment means. The bolt 184 or other attachment means may be inserted through the hinge 126, or, if desired, the hinge 126 may include an aperture formed therethrough to facilitate the attachment of a second portion 165 of the hinge 126 to the collar 182 or other portion of the vehicle. It will be appreciated that the second portion 165 of the hinge 126 may be attached to the vehicle by any suitable attachment means. Thus, the airbag door 124 is attached to the vehicle by the hinge 126. The hinge 126 allows the airbag 128 to force the airbag door 124 free from the instrument panel 110, yet retains the airbag door 124 such that the airbag door 124 does not freely enter the interior cabin of the vehicle. It will be appreciated that the chute 60 of the previous embodiment may be attached to the instrument panel and airbag assembly 110 to retain the hinge 126 in lieu of the conventional collar 182. In a preferred embodiment, the outer layer 114, the hinge 126, and a chute, similar to the chute 60, are formed from the same material, and may be formed simultaneously in mold cavities that may be connected by the apertures 113, as described herein.

It will be appreciated that unlike the hinge 26, the hinge 126 does not include an aperture formed therein. Instead, the second portion 165 of the hinge 126 may be secured to the collar 182 such that the hinge 126 includes a loop portion 183. The loop portion 183 is disposed between the first portion 155 of the hinge 126 secured to the airbag door 124 and the second portion 165 of the hinge 126 secured to the collar 38. The loop portion 183 allows the airbag door 124 to extend further away from the airbag module 118, such that the airbag door 124 is clear of the airbag 128 as the airbag 128 deploys. Thus, the loop portion 183 of the hinge 126 allows the airbag door 124 to move free of the path of the airbag 128 during deployment.

It will be appreciated that in any of the forming and molding processes described herein, the curing conditions, including, but not limited to temperature and pressure, and the curing duration within each of the mold cavities may be varied and controlled to affect final the characteristics of the material being molded. Thus, when the same materials are introduced into various mold cavities or various portions of the same mold cavity, the final characteristics of the same material may vary due to the curing conditions and duration experienced by that particular portion of the material.

It will be appreciated that any combination of the elements of the invention may be combined and practiced in accordance with the present invention.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of forming an airbag assembly and trim component for a vehicle comprising:
   a. forming a substrate in a mold, the substrate defining an airbag door and having a passenger-compartment-facing first surface and a second surface opposite the first surface; and
   b. subsequent to step (a), simultaneously over-molding in the mold an outer layer on the first surface of the substrate, and a hinge on the second surface of the substrate, the hinge for retaining the airbag door on the substrate during deployment of an air bag, wherein the substrate is formed from a first material, and the hinge and the outer layer are formed from a second material different from the first material.

2. The method of claim 1, wherein the step of over-molding the hinge includes over-molding scrim material within the hinge.

3. The method of claim 1, wherein the airbag assembly includes an airbag module housing having a closed end and an open end, a plurality of outwardly extending mounting hooks being formed at the open end, wherein the airbag chute includes a plurality of hook-receiving apertures for receiving the hooks, wherein the hinge includes a plurality of elongated hook-receiving apertures for receiving the hooks, the hook-receiving apertures of the hinge extending inboard of the hooks such that the hinge is movable between a refracted position and an extended position relative to the chute, and wherein the hook-receiving apertures allow movement of the airbag chute relative to, and unrestrained by the hooks when the hinge moves between the refracted position and the extended position.

4. A method of forming an airbag assembly and trim component for a vehicle comprising:
 a. providing a substrate defining an airbag door, the substrate having a passenger-compartment-facing first surface and a second surface opposite the first surface; and
 b. simultaneously over-molding an outer layer on the first surface of the substrate and a hinge on the second surface of the substrate, the hinge for retaining the airbag door on the substrate during deployment of an air bag, wherein the binge and the outer layer are formed from the same material, and wherein the substrate includes an aperture, such that the material flows through the aperture from one of the hinge and the outer layer to the other of the hinge and the outer layer during over-molding, thereby defining the airbag assembly and trim component.

5. A method of forming an airbag assembly and trim component for a vehicle comprising:
 a. providing a mold assembly having a mold cavity;
 b. placing a substrate defining an airbag door into the mold cavity to define first and second cavities, the substrate having a passenger-compartment-facing first surface and a second surface opposite the first surface;
 c. simultaneously injecting a first material into the first cavity to form an outer layer on the first surface, and injecting a second material into the second cavity to form a hinge on the second surface of the substrate, the hinge for retaining the airbag door on the substrate during deployment of an air bag.

6. The method of claim 5, wherein the first and second materials are the same material.

7. The method of claim 5, wherein the step of injecting the second material into the second cavity includes inserting scrim material within the second cavity.

8. A method of forming an airbag assembly and trim component for a vehicle comprising:
 a. providing a substrate defining an airbag door, the substrate having a passenger-compartment-facing first surface and a second surface opposite the first surface; and
 b. simultaneously over-molding each of:
 an outer layer on the first surface of the substrate,
 a hinge on the second surface of the substrate, the hinge for retaining the airbag door on the substrate during deployment of an air bag,
 scrim material within the hinge, and
 an airbag chute for mounting the airbag assembly with the outer layer and the hinge, the airbag chute being formed on the second surface of the substrate with the hinge,
 wherein the hinge and the outer layer are formed from the same material, and
 wherein the substrate includes an aperture, such that the material flows through the aperture from one of the hinge and the outer layer to the other of the hinge and the outer layer during over-molding, thereby defining the airbag assembly and trim component.

9. The method of claim 8, wherein the hinge and the airbag chute are formed from the same material.

10. The method of claim 9, wherein the substrate is formed from a first material, the outer layer is formed from a second material, and the hinge and the airbag chute are formed from a third material.

11. The method of claim 10, wherein the third material is different from the first material and the second material.

12. The method of claim 8, wherein the airbag assembly includes an airbag module housing having a closed end and an open end, a plurality of outwardly extending mounting hooks being formed at the open end, wherein the airbag chute includes a plurality of book-receiving apertures for receiving the hooks, wherein the hinge includes a plurality of elongated hook-receiving apertures for receiving the hooks, the hook-receiving apertures of the hinge extending inboard of the hooks such that the hinge is movable between a retracted position and an extended position relative to the chute, and wherein the hook-receiving apertures allow movement of the airbag chute relative to, and unrestrained by the hooks when the hinge moves between the retracted position and the extended position.

* * * * *

UNITED STATES PATENT AND TRADEMARK OFFICE
CERTIFICATE OF CORRECTION

PATENT NO. : 7,291,301 B2
APPLICATION NO. : 10/731244
DATED : November 6, 2007
INVENTOR(S) : Glenn A. Cowelchuk et al.

It is certified that error appears in the above-identified patent and that said Letters Patent is hereby corrected as shown below:

Column 12, Claim 3, Line 65, delete "refracted" and insert --retracted--.

Column 13, Claim 4, Line 13, delete "binge" and insert --hinge--.

Signed and Sealed this

Eighteenth Day of March, 2008

JON W. DUDAS
*Director of the United States Patent and Trademark Office*